(12) United States Patent
Hoban

(10) Patent No.: US 8,085,803 B2
(45) Date of Patent: Dec. 27, 2011

(54) METHOD AND APPARATUS FOR IMPROVING QUALITY OF SERVICE FOR PACKETIZED VOICE

(75) Inventor: Adrian C. Hoban, Mayo (IE)

(73) Assignee: Intel Corporation, Santa Clara, CA (US)

( * ) Notice: Subject to any disclaimer, the term of this patent is extended or adjusted under 35 U.S.C. 154(b) by 590 days.

(21) Appl. No.: 11/699,304

(22) Filed: Jan. 29, 2007

(65) Prior Publication Data

US 2008/0181104 A1 Jul. 31, 2008

(51) Int. Cl.
*H04L 12/54* (2006.01)
(52) U.S. Cl. ...................................................... 370/428
(58) Field of Classification Search ....... 370/229–235.1, 370/351–428, 429
See application file for complete search history.

(56) References Cited

U.S. PATENT DOCUMENTS

| 6,377,541 | B1 * | 4/2002 | Boetzel | 370/216 |
| 6,603,759 | B1 * | 8/2003 | Moskal et al. | 370/352 |
| 6,711,126 | B1 * | 3/2004 | Besset-Bathias | 370/229 |
| 7,203,164 | B2 * | 4/2007 | Gummalla et al. | 370/230 |
| 2003/0067922 | A1 * | 4/2003 | Yoshitani | 370/394 |
| 2003/0202528 | A1 * | 10/2003 | Eckberg | 370/412 |
| 2004/0218617 | A1 * | 11/2004 | Sagfors | 370/412 |
| 2006/0092918 | A1 * | 5/2006 | Talalai | 370/352 |
| 2008/0002617 | A1 * | 1/2008 | Peisa et al. | 370/329 |

* cited by examiner

*Primary Examiner* — Kwang B Yao
*Assistant Examiner* — Obaidul Huq
(74) *Attorney, Agent, or Firm* — Caroline M. Fleming

(57) ABSTRACT

Queued real-time voice received over a data network is actively managed. Upon detecting that the amount of real-time voice stored in the queue has reached a first threshold, a selection process selects non-consecutive portions of the voice to remove from the queue while maintaining a high Quality of Service (QoS) and ensuring that the queue does not overflow.

18 Claims, 3 Drawing Sheets

METHOD AND APPARATUS FOR IMPROVING QUALITY OF SERVICE FOR PACKETIZED VOICE

FIELD

This disclosure relates to transmitting audio over a packet network and in particular to improving quality of service of packetized voice streams.

BACKGROUND

Real-time audio, such as speech or voice in a telephone conversation may be stored in the payload of one or more data packets and transmitted over a data network, such as the Internet. One standard protocol for packetizing real-time audio for transmission over a data network is the Real-Time Transport Protocol ("RTP") (Request for Comments ("RFC") 1889, January 1996) at http://www.ietf.org/rfc/rfc/1889.txt A system that includes both an Internet interface and a high speed serial (HSS) interface may receive voice packet data or audio stored in the payload of a network packet from an Internet Protocol (IP) telephone through the Internet interface to be forwarded to a Plain Old Telephone Service (POTS) telephone through the HSS interface In order to minimize the number of packets dropped (not delivered), the system may temporarily store voice packet data received from the data network in a queue prior to forwarding them to the POTS telephone via a telephone network. However, if the rate at which voice packet data is added to the queue differs from the rate at which the voice packet data is removed from the queue, the voice packet data that is stored in the queue may increase over time.

In real world scenarios featuring POTS telephones, network processors, the Internet and IP telephones many factors can contribute to queue overload conditions which may result in dropped voice packets. For example, in contrast to a dedicated connection provided by a telephone network, each network packet may travel on a different path over the data network. This may result in a large burst of network packets being delivered to the system over the data network in a short period.

The number of voice packet data stored in the queue may affect the quality of the telephone conversation. For example, if the queue stores a maximum of 16 voice packet data and each voice packet data is 10 milliseconds (ms); this represents 160 ms of voice packet data which is greater than the typical 150 ms end-to-end latency requirement for "toll quality" calls. Also, the quality of service may be further reduced because received data packets may be dropped if the queue is full.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

The manner in which audio received in the payload of a data packet is dropped (not delivered to the destination) has a significant impact on received voice quality. For example, if ten consecutive voice packet data each containing 10 ms of voice (or audio) are dropped, that is, not delivered to a listener, the listener experiences 0.1 sec of lost voice which is noticeable during speech bursts and may manifest itself as a crackling noise.

In an embodiment of the invention, a queue manager manages queue overload scenarios and selects voice packet data to drop so as to minimize impact on voice quality.

Figure 1:
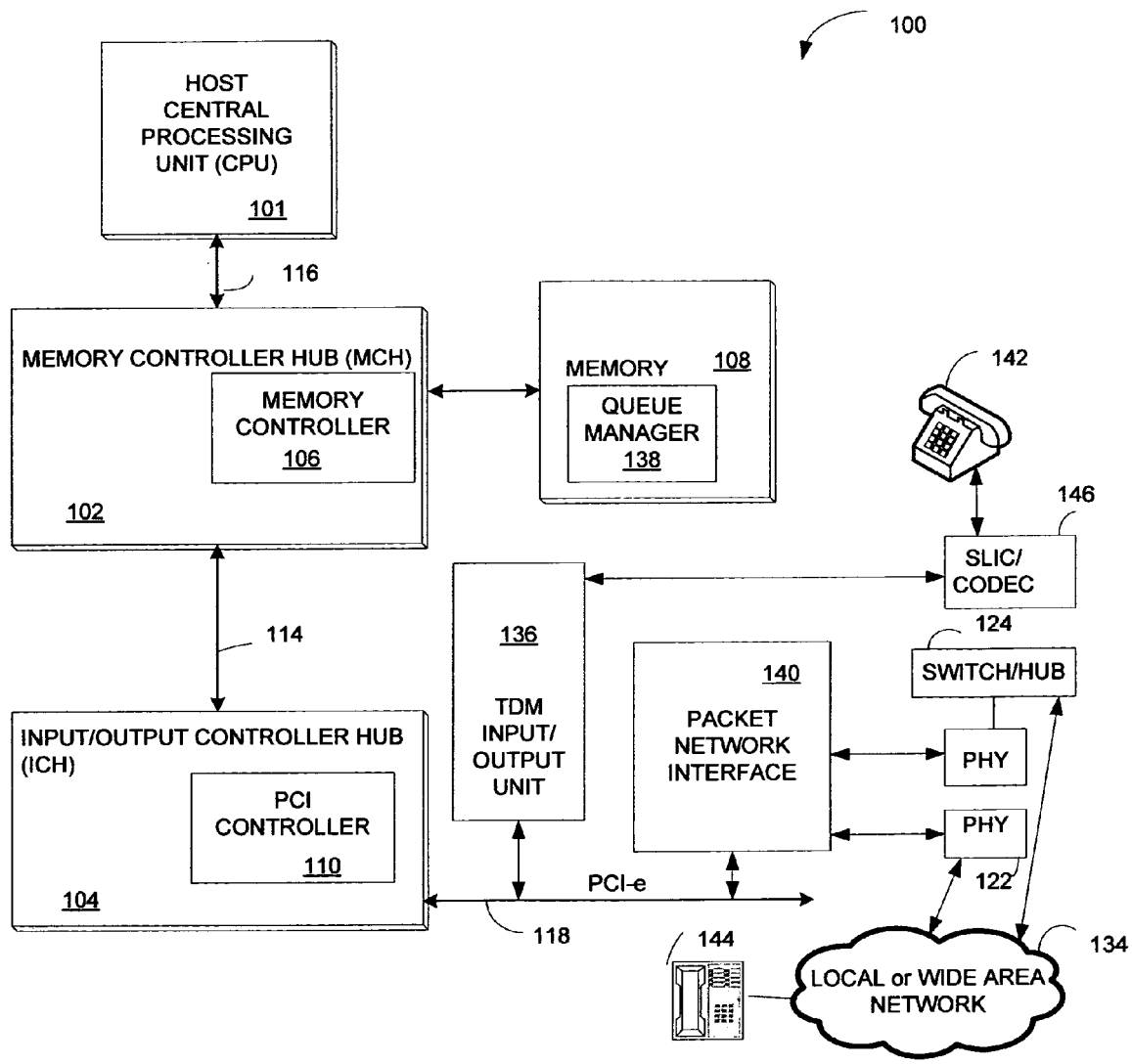
FIG. 1 is a block diagram of a system that includes an embodiment of a queue manager according to the principles of the present invention.

FIG. 1 is a block diagram of a system 100 that includes an embodiment of a queue manager 138 according to the principles of the present invention. The system 100 includes a Host Central Processing Unit (CPU) 101, a Memory Controller Hub (MCH) 102, and an I/O Controller Hub (ICH) 104. The MCH 102 includes a memory controller 106 that controls communication between the CPU 101 and memory 108. The CPU 101 and MCH 102 communicate over a system bus 116.

The Host Central Processing Unit (CPU) 101 may be any one of a plurality of processors such as a single core Intel® Pentium IV® processor, a single core Intel Celeron processor, an ®XScale processor or a multi-core processor such as Intel® Pentium D, Intel® Xeon® processor, or Intel® Core® Duo processor or any other type of processor.

The memory 108 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 104 may be coupled to the MCH 102 using a high speed chip-to-chip interconnect 114 such as Direct Media Interface (DMI). DMI supports 2 Gigabit/second concurrent transfer rates via two unidirectional lanes.

The ICH 104 may include a Peripheral Component Interconnect (PCI) or Peripheral Component Interconnect Express (PCI-e) bus controller 110 for controlling communication with devices coupled to the ICH 104 that communicate with the ICH 104 over a PCI or PCI-e bus 118.

A packet network interface 140 and a TDM I/O unit 136 may be coupled to the ICH 104 through the PCI or PCI-e bus 118. The packet network interface 140 processes data packets which may be received over a wide area network (WAN) 134 through a phy 122 coupled to the network processor 112 or may be received from a local area network (LAN) 134 through a switch or hub 124 coupled to another phy 122.

The TDM I/O unit 136 is a high speed serial interface that includes support for T1/E1/J1 TDM links. The TDM I/O unit 136 allows direct connection to a T1/E1/J1 framer or to a SLIC/CODEC 146. For example, Intel® Corporation's IXP2350 network processor includes a high speed serial interface (network processing engine (NPE)) that supports a direct connection to a T1/E1/J1 framer. The external T1/E1/J1 framer may be an Intel® IXF3208 or Intel® IXF3204 with a plurality of ports each of which may operate at 1.544 Mbps or 2.048 Mbps. Each port operates independently allowing each channel to be individually configured for T1, E1 or J1.

T1 also referred to as a T-1 carrier is a high speed communications line that supports a data rate of 1.544 Mega bits per second (Mbps) by multiplexing 24 separate 64 Kilo bits per second (Kbps) channels into a single data stream. E1 is a European transmission format that supports data rates of 2.048 Mbps over 30 channels. J1 is a variant of T1 used in Japan supporting a data rate of 1.544 Mbps over 24 channels.

The SLIC/CODEC 146 digitizes analog audio (audible sound waves), for example, voice (sound produced by humans) or musical sound that may be received from an analog Plain Old Telephone Service (POTS) telephone and forwards the digitized audio over a High Speed Serial (HSS) interface to the TDM I/O unit 136. For example, if the CODEC implements the G.711 protocol the audio input is sampled 8,000 times per second. The sampled analog audio signal (voice) is converted into a digital format and encoded into frames.

A network data packet is generated by adding data network protocol headers to the encoded frame or payload (voice packet data). The data packet is forwarded to a packet network interface 140, for example, an Ethernet interface and over the local or wide area network 134 to an Internet telephone 144. The data packet includes a payload and may include one or more headers such as an Internet Protocol ("IP") header, a User Datagram Protocol ("UDP") header and/or a Real-time Transport Protocol ("RTP") header. For example, the data packet may include an 80 byte payload for 10 milliseconds of 8 Kilo Hertz (KHz) A-Law voice samples from the TDM I/O unit 136.

There are a number of clock domains in the system shown in FIG. 1. The clocks in each of the clock domains are not synchronized and may run slightly faster or slower than each other. A first clock domain includes the SLIC/CODEC 146 that samples analog audio (voice) and produces digitized audio (voice) at a fixed rate. A second domain includes the network processor clock which may differ in frequency from the SLIC/CODEC clock. Packetized voice data is delivered to the TDM I/O unit 136 and the packet network interface 140 at a rate that is based on the CPU clock. A third clock domain includes a reference clock used by the IP telephone 144 to play out received digitized voice data.

If the clock in clock domain 3 is running slightly faster than the clock in domain 1 or domain 2, the system 100 and the IP telephone 144 may produce data faster than the data may be transmitted to the SLIC/CODEC 146. Thus, the amount of data stored in a transmit queue in the system 100 to be transmitted to the SLIC/CODEC 146 may increase over time.

A packet de-jitter component in the system 100 may remove variance in the arrival of network packets, that is, data is transmitted to the SLIC/CODEC 146 with fixed spacing. However, even though jitter is removed there is a gradual increase in the data stored in the transmit queue over time due to the difference in clock rates. The rate at which the data stored in the transmit queue increases is dependent on the level of clock skew between producer and consumer clock domains. If data stored in the transmit queue having a fixed maximum queue depth, that is, the maximum number of queue entries is fixed, is removed at a slower rate than data is being added, queue overload may occur.

The packet network interface 140 buffers network packets as they enter and leave the system 100 to/from the LAN/WAN 134. In one embodiment, the packet network interface 140 may provide support for handling Gigabit Ethernet packets as they enter and leave the system 100.

The TDM I/O unit 136 provides an interface between the CPU 101 and an external TDM interface, for example, an E1, J1 or T1 framer or SLIC/CODEC 146. The TDM I/O unit 136 is a processing engine which performs much of the low level processing of data as it enters and leaves through the external TDM interface.

The CPU 101 in conjunction with a queue manager 138 and other managers which may be stored in memory 108 manages streaming data through a series of different media processing components such as, the TDM I/O unit 136 and the packet network interface 140. The processing of media streams may include echo cancellation, conferencing, voice CODECs and tone detection.

In the embodiment shown the queue manager 138 is implemented in software in stored in memory 108. In other embodiments the queue manager 138 may be implemented in hardware as a separate component that may be coupled to the PCI-e bus 118 and may be accessed by the TDM I/O unit 136 and the packet network interface 140.

In the transmit direction, the TDM I/O unit 136 takes data originating in the CPU 101 in packetized format, and processes it such that it is transmitted correctly to the external TDM interface. In the receive direction data received from the external TDM interface is packetized and forwarded to the CPU 101. An embodiment of a queue manager 138 manages the queues which form a communication link between the TDM I/O unit 136 and the CPU 101.

The TDM I/O unit 136 temporarily stores the audio to be transmitted to the external TDM interface. In an embodiment, a circular transmit queue that may be stored in memory 108 includes a plurality of entries. Each entry includes a pointer to a buffer in memory 108 in which audio to be transmitted may be stored. The audio may be voice packet data received in the payload of Voice over Internet Protocol (VoIP) packet from the packet network interface 140. In one embodiment, the voice packet data has 80 bytes.

Figure 2:
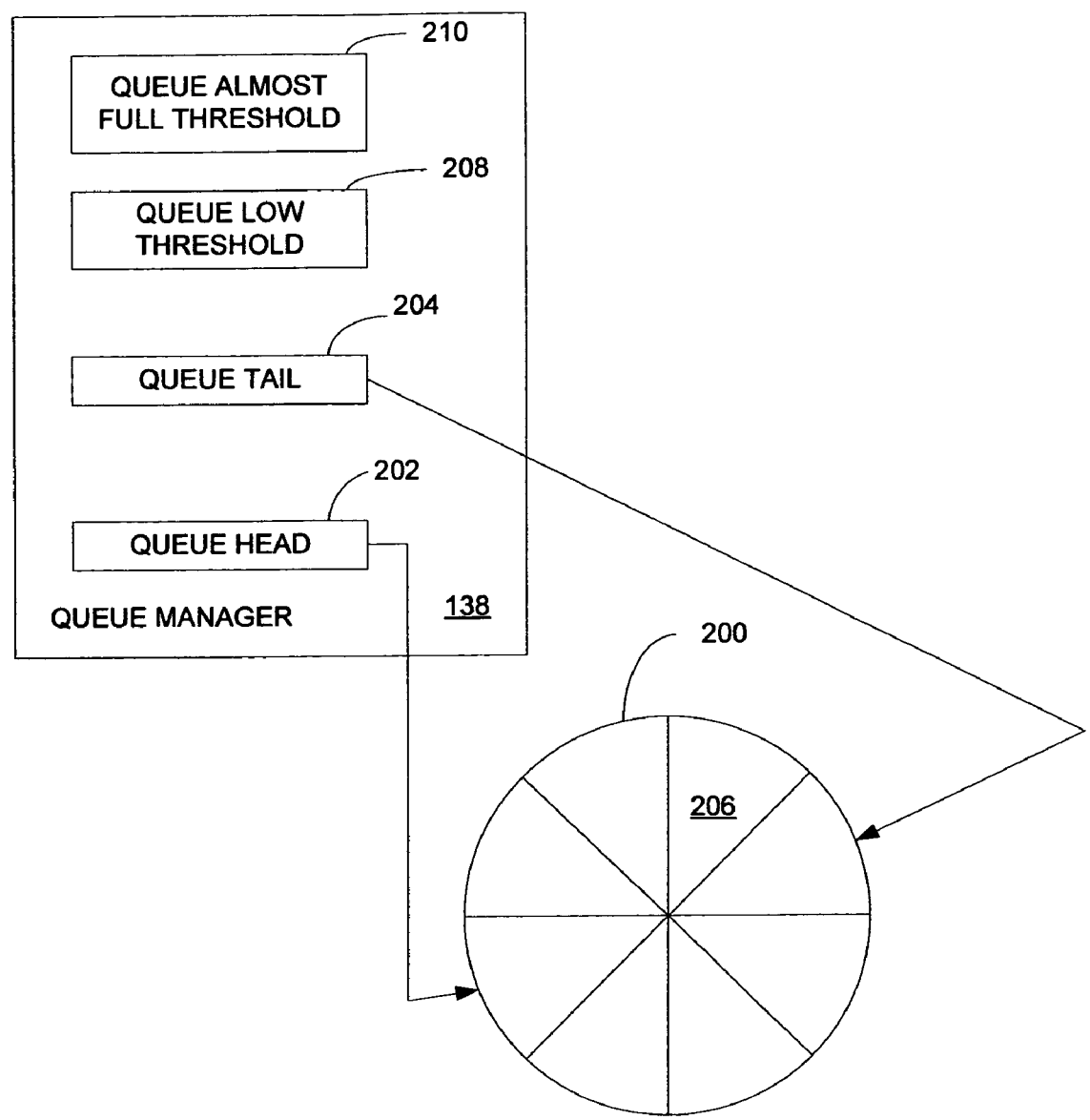
FIG. 2 is a block diagram of an embodiment of a circular transmit queue having a plurality of entries that may be managed by the queue manager shown in FIG. 1.

FIG. 2 is a block diagram of an embodiment of a circular transmit queue 200 having a plurality of entries 206 that may be managed by the queue manager 138 shown in FIG. 1. The circular transmit queue 200 is stored in memory 108 and has an associated head pointer 202 and tail pointer 204. The head pointer 202 stores a pointer to the last entry in the queue written by the CPU 101. The tail pointer 204 stores a pointer to the last entry in the queue read by the CPU 101. The head pointer 202 is written by the CPU 101 and read by the TDM I/O unit 136. The tail pointer 204 is written by the TDM I/O unit 136 and read by the CPU 101. Entries may be stored in the queue in a First In First Out (FIFO) order.

An entry 206 in the circular transmit queue 200 may store a pointer to a buffer in memory 108 that may be used to store generic packet data, or voice packet data. The voice packet data may be extracted from the payload of a VoIP packet received over the IP network (WAN OR LAN 134). At a fixed rate, the TDM I/O unit 136 reads voice packet data from buffer pointers stored in entries in the circular transmit queue 200. At the same fixed rate the TDM I/O unit then transmits the voice packet data to the SLIC/CODEC 146. The queue manager 138 stores "an almost full threshold value" or "queue high threshold value" 210 and a "queue low threshold value" 208 which may be programmable dependent on the maximum depth of the circular transmit queue 200. The queue manager 138 also manages the queue head pointer 206 and the queue tail pointer 204 and may periodically check the number of entries stored on the circular transmit queue 200.

Figure 3:
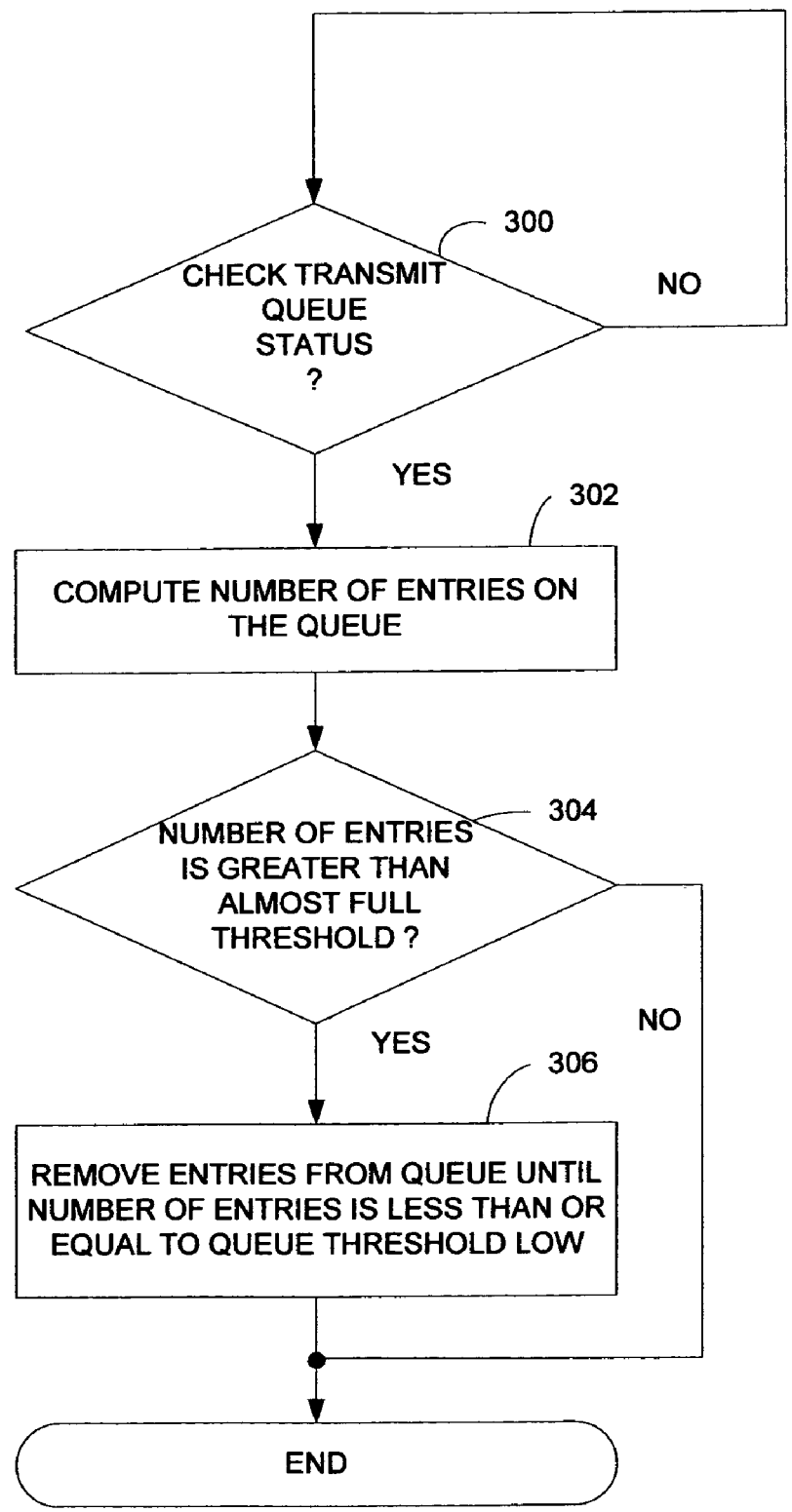
FIG. 3 is a flow graph illustrating an embodiment of a method for improving quality of service of packetized audio.

FIG. 3 is a flow graph illustrating an embodiment of a method for improving quality of service of packetized audio. FIG. 3 is described in conjunction with FIG. 2.

At block 300, the queue manager 138 periodically checks the number of entries on the transmit queue 200. In an embodiment, the time period for checking the status may be provided by a kernel timer which may generate an interrupt to the CPU 101 to indicate that the queue manager 138 should check the status of the transmit queue 200. Upon detecting that the transmit queue 200 is to be checked, processing continues with block 302.

At block 302, the difference between the queue head pointer 206 used to add packets to the circular transmit queue 200 and the queue tail pointer 204 used to remove entries from the circular transmit queue 200 is computed. Processing continues with block 304.

At block 304, the difference between the queue tail pointer 204 and the queue head pointer 206 is compared with the "queue almost full threshold" 210. If the difference is greater than or equal to the "queue almost full threshold" 210, processing continues with block 306 to remove entries from the circular transmit queue 200. If not, processing is complete.

At block 306, entries 206 are removed from the circular transmit queue 200 until the difference is equal or less than a "queue low threshold" 208. The voice packet data to be dropped is selected so as not to drop consecutive voice packet data. By not dropping consecutive voice packet data, the impact on voice quality on both the human ear and Packet Loss Concealment (PLC) algorithms that may be used is reduced.

In one embodiment, when the "queue almost full threshold" for the circular transmit queue 200 is reached, starting with the most recent voice packet data received from the packet network (newest entry) that is stored in the transmit queue 200, every second entry 206 is removed from the transmit queue 200. Thus, voice packet data associated with the entry 206 is dropped, that is, the voice packet data is not forwarded to the TDM I/O unit 136 to be forwarded to the POTS telephone 146.

Non-consecutive voice packet data continues to be dropped until the "queue low threshold" 208 is reached. In this embodiment, the first voice packet data dropped is the newest voice packet data because the oldest voice packet data in the transmit queue 200 may be in the process of being transmitted. In order to remove entries 206 starting with the oldest entry in the queue, an additional locking mechanism is needed in order to ensure that the voice packet data to be dropped from the transmit queue 200 is not already in the process of being transmitted from the transmit queue 200. Processing is complete.

In another embodiment, a locking mechanism may be used and the oldest voice packet data stored in the circular transmit queue 200 is dropped first followed by every second voice packet data stored in the circular transmit queue 200. This provides for the timeliness of data to take a higher precedence over reliable delivery of the data. However, this may result in a decrease in system performance due to the need for a locking mechanism.

In yet another embodiment, instead of dropping every second non-consecutive voice packet data, every "nth" non-consecutive voice packet data may be dropped to minimize the impact of dropped voice packet data and optimize the quality of service.

In another embodiment, the drop pattern may be non-linear, for example, an inverse logarithmic decay pattern may be used to select the non-consecutive voice packet data to be dropped. However, as the depth of the circular transmit queue 200 is relatively small, typically less than 15 entries 206, there may be a decreasing return in implementing much more complex packet drop algorithms in order to improve voice quality.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:
a queue to store received audio packet data extracted from the payload of a Voice over Internet Protocol packet, the received audio packet data to be transmitted to a Plain Old Telephone Service (POTS) telephone; and
a queue manager to periodically check a number of audio packet data in the queue to detect when the number of audio packet data stored in the queue reaches a high threshold and to select non-consecutive audio packet data to remove from the queue until the number of audio packet data stored in the queue reaches a low threshold, the low threshold being less than the high threshold, the number of entries on the queue is checked by computing a difference between a queue head pointer and a queue tail pointer and voice packet data identified in the queue is read from the queue at a fixed rate and forwarded to a framer, the queue is a circular queue, the entry in the circular queue stores a pointer to a buffer in memory in which the received audio packet data to be transmitted to the POTS telephone is stored and non-consecutive received audio packet data is dropped by removing the pointer to the received audio packet data from the entry in the circular queue.

2. The apparatus of claim 1, wherein every nth non-consecutive audio packet data in the queue is removed from the queue starting with the most recent voice packet data received from a packet network.

3. The apparatus of claim 2, wherein n is two.

4. The apparatus of claim 1, wherein audio packet data are stored on the queue in a First In First Out (FIFO) order.

5. The apparatus of claim 1, wherein the audio packet data is voice.

6. The apparatus of claim 1, wherein the audio packet data is a portion of real-time contiguous speech to be delivered at a fixed rate to a listener and the low threshold and the high threshold are selected to improve quality of the speech delivered to the listener.

7. The apparatus of claim 1, wherein the maximum number of entries in the queue is less than 15 and the audio packet data is 80 bytes.

8. A method comprising:
storing received audio packet data in a queue, the received audio packet data extracted from the payload of a Voice over Internet Protocol packet, the received audio packet data to be transmitted to a Plain Old Telephone Service (POTS) telephone;
periodically checking a number of audio packet data in the queue; and
upon detecting that the number of audio packet data stored in the queue has reached a first a high threshold, selecting non-consecutive audio packet data to be removed from the queue until the number of audio packet data stored on the queue reaches a low threshold, the low threshold being less than the high threshold, the number of entries on the queue is checked by computing a difference between a queue head pointer and a queue tail pointer and voice packet data identified in the queue is read from the queue at a fixed rate and forwarded to a framer, the queue is a circular queue, the entry in the circular queue stores a pointer to a buffer in memory in which the received audio packet data to be transmitted to the POTS telephone is stored and non-consecutive received audio packet data is dropped by removing the pointer to the received audio packet data from the entry in the circular queue.

9. The method of claim 8, wherein every nth non-consecutive audio packet data in the queue is removed from the queue starting with the most recent voice packet data received from a packet network.

10. The method of claim 8, wherein n is two.

11. The method of claim 8, wherein the audio packet data is a portion of contiguous speech to be delivered at a fixed rate to a listener and the high threshold and the low threshold are selected to improve quality of the speech delivered to the listener.

12. The method of claim 8, wherein audio packet data are stored in the queue in a First In First Out (FIFO) order.

13. The method of claim 12, wherein the queue is a circular queue.

14. The method of claim 8, wherein the audio packet data is voice.

15. The method of claim 8, wherein the audio packet data is real-time voice received over a data network.

16. The method of claim 15, wherein the non-consecutive audio packet data to drop is selected to minimize impact on voice quality.

17. The method of claim 8, wherein an entry in the queue stores a pointer to a buffer in memory to store the audio packet data.

18. The method of claim 8, wherein the maximum number of entries in the queue is less than 15 and the audio packet data is 80 bytes.

* * * * *